(12) United States Patent
Landwehr

(10) Patent No.: US 8,111,055 B2
(45) Date of Patent: Feb. 7, 2012

(54) METHOD FOR CONTROLLING A DIRECT CURRENT CHOPPER CONTROLLER

(75) Inventor: Frank Landwehr, Dortmund (DE)

(73) Assignee: Kostal Industrie Elektrik GmbH, Luedenscheid (DE)

( * ) Notice: Subject to any disclaimer, the term of this patent is extended or adjusted under 35 U.S.C. 154(b) by 722 days.

(21) Appl. No.: 12/267,816

(22) Filed: Nov. 10, 2008

(65) Prior Publication Data

US 2009/0134855 A1 May 28, 2009

(30) Foreign Application Priority Data

Nov. 28, 2007 (DE) .......................... 10 2007 057 230

(51) Int. Cl.
*G05F 1/00* (2006.01)
*G05F 3/16* (2006.01)
(52) U.S. Cl. ........................................ 323/272; 323/225
(58) Field of Classification Search .................. 323/225, 323/268, 271–272, 282–286
See application file for complete search history.

(56) References Cited

U.S. PATENT DOCUMENTS

| | | | | |
|---|---|---|---|---|
| 5,861,734 A | * | 1/1999 | Fasullo et al. ................. | 323/222 |
| 2002/0036486 A1 | * | 3/2002 | Zhou et al. .................... | 323/272 |
| 2002/0048180 A1 | * | 4/2002 | Dancy et al. ................... | 363/65 |
| 2002/0135338 A1 | * | 9/2002 | Hobrecht et al. ............. | 323/272 |
| 2003/0090254 A1 | * | 5/2003 | Strijker ......................... | 323/283 |
| 2003/0231047 A1 | * | 12/2003 | Deaton ......................... | 327/427 |
| 2005/0017699 A1 | * | 1/2005 | Stanley ......................... | 323/282 |
| 2005/0036337 A1 | * | 2/2005 | Zhang et al. .................. | 363/17 |
| 2008/0022139 A1 | * | 1/2008 | Lin et al. ...................... | 713/320 |

FOREIGN PATENT DOCUMENTS

DE  10 2007 041 510  3/2009

\* cited by examiner

*Primary Examiner* — Adolf Berhane
*Assistant Examiner* — Jeffrey Gblende
(74) *Attorney, Agent, or Firm* — Brooks Kushman P.C.

(57) ABSTRACT

A method of controlling a direct current ("DC") chopper controller having a switch and a storage choke in which the choke has a current dependent on the switching of the switch on and off includes the following. A current variable derived from one of the time averaged value of the current of the choke and the peak value of the current of the choke is determined. A switching frequency for synchronizing the turning on and off the switch is calculated as a function of the current variable and on whether the current variable exceeds a current threshold. The switching frequency is determined to be a predetermined low frequency if the switching frequency is lower than the low frequency and is determined to be a predetermined high frequency if the switching frequency is greater than the high frequency. The switch is switched on and off in accordance with the switching frequency.

10 Claims, 3 Drawing Sheets

METHOD FOR CONTROLLING A DIRECT CURRENT CHOPPER CONTROLLER

CROSS-REFERENCE TO RELATED APPLICATIONS

This application claims foreign priority benefits under 35 U.S.C. §119(a)-(d) to DE 10 2007 057 230.3, filed Nov. 28, 2007, which is hereby incorporated by reference in its entirety.

BACKGROUND OF THE INVENTION

1. Field of the Invention

The present invention relates to a method for controlling a direct current chopper controller which has at least one current channel with each current channel having a storage choke and semiconductor switches which are controllable by a micro-controller.

2. Background Art

DE 10 2007 041 510 describes a direct current ("DC") chopper controller which may operate either as a step-up converter or a step-down converter. The controller includes multiple current channels each including a storage choke and semiconductor switches. A micro-controller is operable to control the switches. The controller is operated at the edge of the gap (i.e., in the transition-mode) as switching losses of the switches are minimal here under full-load operation. The drop in the coil current in one of the current channels to zero value is sensed in order to again switch the current channels displaced in phase with respect to one another. In each cycle, the storage chokes are fully magnetized. At small currents, the switching frequency of the switches can become quite large. The losses thereby increase strongly because of magnetic reversal in the storage chokes and/or switching losses in the switches whereby the efficiency is lowered in the partial-load region.

SUMMARY OF THE INVENTION

An object of the present invention is a method for operating a direct current ("DC") chopper controller such that improved efficiencies in the partial-load region are obtained.

In carrying out the above object and other objects, the present invention provides a method of controlling a DC chopper controller having a transistor switch and a storage choke. The storage choke has a coil current which depends on the switching of the switch on and off. The method includes determining a coil current variable derived from one of the time averaged value of the coil current of the storage choke and the peak value of the coil current of the storage choke. A switching frequency for synchronizing the turning on and the turning off of the switch is calculated as a function of the coil current variable and on the condition of whether the coil current variable exceeds a predetermined current threshold. The switching frequency is determined to be a predetermined low switching frequency if the switching frequency is lower than the predetermined low switching frequency. The switching frequency is determined to be a predetermined high switching frequency if the switching frequency is greater than the predetermined high switching frequency. The switch is switched on and off in accordance with the switching frequency.

Further, in carrying out the above object and other objects, the present invention provides a method of controlling a DC chopper controller having first and second channels connected in parallel to one another. Each channel includes a transistor switch and a storage choke. The storage choke of each channel has a coil current which depends on the switching of the switches on and off. The method includes, for each channel, determining a coil current variable derived from one of the time averaged value of the coil current of the storage choke of the channel and the peak value of the coil current of the storage choke of the channel. While the switch of the second channel is switched off, the switch of the second channel is switched on if the coil current of the storage choke of the second channel is greater than a predetermined off current threshold. While the switch of the second channel is switched on, the switch of the second channel is switched off if the coil current of the storage choke of the second channel is less than a predetermined on current threshold. A switching frequency for synchronizing the turning on and the turning off of the switch of the first channel is calculated as a function of the coil current variable of the first channel and on the condition of whether the coil current variable of the first channel exceeds a predetermined current threshold. The switching frequency is determined to be a predetermined low switching frequency if the switching frequency is lower than the predetermined low switching frequency. The switching frequency is determined to be a predetermined high switching frequency if the switching frequency is greater than the predetermined high switching frequency. The switch of the first channel is turned on and off in accordance with the switching frequency.

In embodiments of the present invention, the switching frequency for synchronizing at least one switch of a DC chopper controller is calculated in the partial-load region and is limited to a value between a fixed minimum value and a fixed maximum value. This leads to a discontinuous (i.e., gapping type) operation in the partial-load region. Only at higher loads does the controller transition from discontinuous operation into operation at the edge of the gap (i.e., transition mode operation). At even higher loads, depending on the design of the controller, either the transition operating mode is maintained (in which the switching frequency is limited by system conditions) or the controller crosses over from the transition operating mode into the continuous operating mode.

In the case of a DC chopper controller having a plurality of parallel current channels, which are driven sequentially as a function of the current detected in a first one of the current channels (the master channel), a load-dependent activation and deactivation of the remaining current channels (the slave channels) is provided. The current in the master channel and possibly in some of the slave channels is increased by the deactivation of the slave channels. This results in increased magnetic reversal and line losses. However, the switching losses of the switches of the controller are reduced so that an overall increase in efficiency can be achieved.

As such, embodiments of the present invention provide a method of controlling a DC chopper controller having at least one semiconductor switch that is controllable by a micro-controller and a storage choke. The switching frequency for synchronizing the switch(es) is calculated in the partial-load region and is limited to a value between a minimum value and a maximum value. In the case of the controller having multiple current channels (a master channel and slave channels), a load-dependent activation and deactivation of the slave channels can be provided. An improvement in the efficiency is thereby achieved in the partial-load region.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 2:
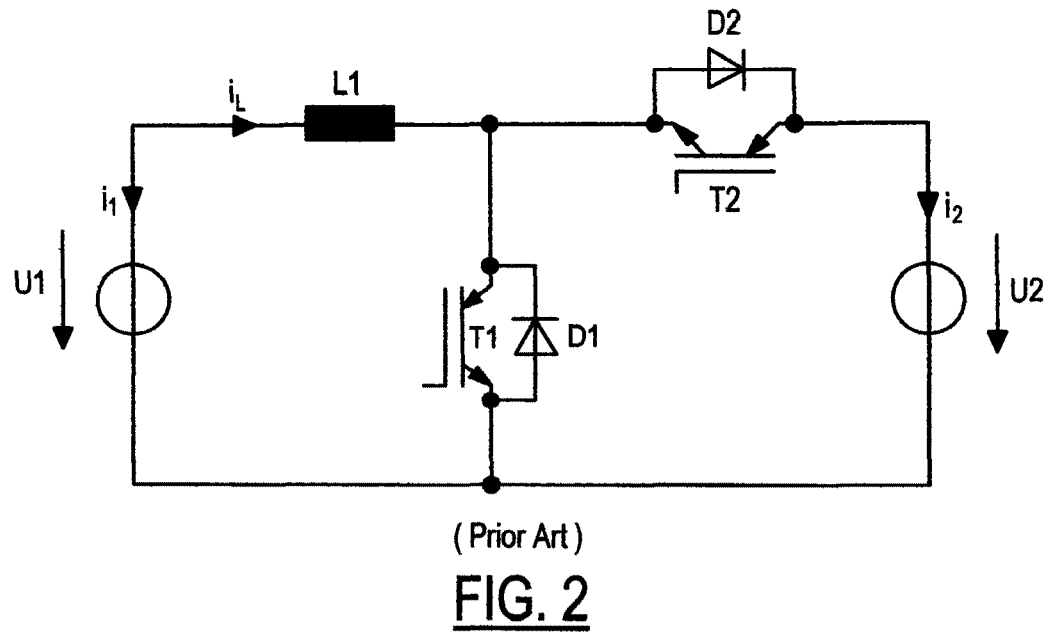
FIG. 2 illustrates a circuit diagram of a bidirectional DC chopper controller.

Referring now to FIG. 2, a circuit diagram of a bidirectional direct current ("DC") chopper controller is shown. The controller includes first and second voltage sources U1, U2, a storage choke (inductor) L1, and first and second semiconductor switches T1, T2. Each switch T1, T2 is an insulated gate bipolar transistor. A first free-running diode D1 is connected in parallel to first switch T1. A second free-running diode D2 is connected in parallel to second switch T2.

Switches T1, T2 are connected with the other components such that for an interconnected first switch T1 storage choke L1 is connected through first switch T1 to first voltage source U1 and such that for an interconnected second switch T2 storage choke L1 is connected in series to second switch T2 and first and second voltage sources U1, U2.

A functional principle of the controller is that by switching on one of switches (T1 and/or T2), storage choke L1 is subjected to current flow that builds up a magnetic field. The energy stored in the magnetic field causes an induction current ($i_1$ and/or $i_2$) after switching off one of the switches (T1 and/or T2) that flows through the diode (D2 and/or D1) associated with the other switch (T2 and/or T1) and one of the voltage sources U2, U1.

Synchronizing of one of the switches (T1 and/or T2) is required for continuous operation. The synchronizing, for example, by pulse width modulation, can be achieved by a central control device such as a micro-controller (not shown in the drawings for simplicity).

Fundamentally, the controller has two operational types: the step-up converter and the step-down converter. The operational type depends on which of switches T1, T2 is synchronized. Each operational type has a plurality of different operating states. These operating states include discontinuous mode operation (gapping type), transition mode operation (edge of the gap), and continuous mode operation.

In order to achieve proper efficiency, at least one operation at the edge of the gap is preferred as the switches (T1 and/or T2) are turned on with zero current thereby resulting in no switching losses.

However, a problem with operating at the edge of the gap is the amount of ripple in the current $i_L$ through storage choke L1 and thus the amount of ripple in the output currents ($i_1$ and/or $i_2$). In order to reduce such ripple, a DC chopper controller is configured to have a plurality of parallel current channels.

Figure 3:
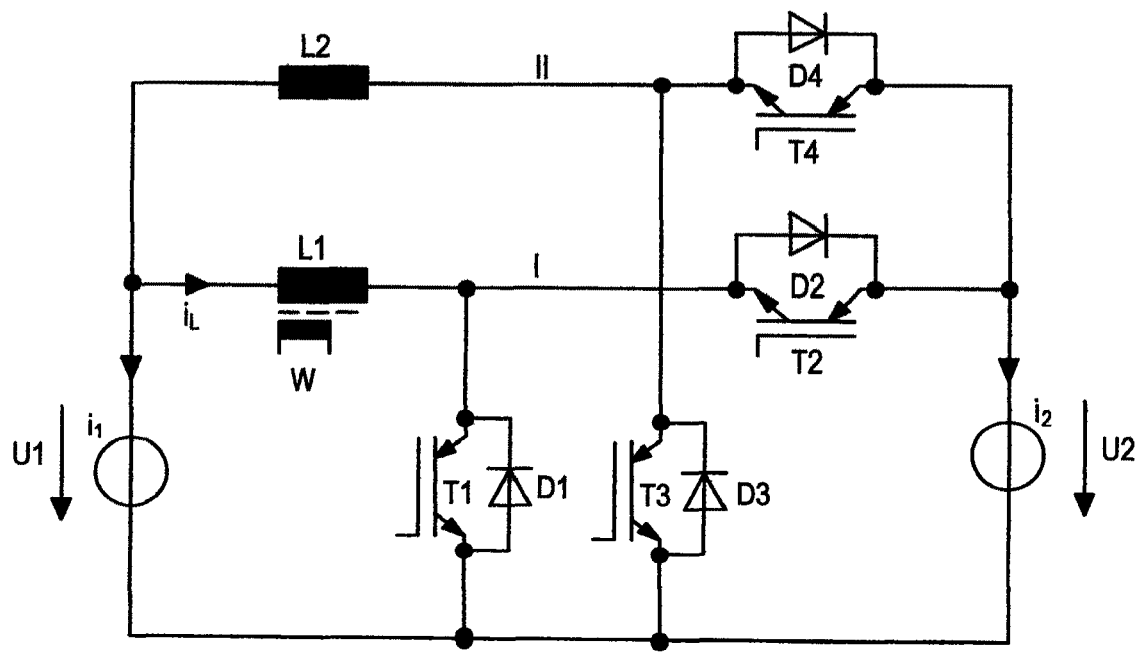
FIG. 3 illustrates a circuit diagram of a multiple current channel DC chopper controller.

Referring now to FIG. 3, with continual reference to FIG. 2, a circuit diagram of a multiple current channel DC chopper controller is shown. The controller includes first and second parallel current channels I, II. Such a controller may have more than two parallel current channels. Having more than two parallel current channels is advantageous despite the increased component cost as the ripple of the storage choke current $i_L$ is reduced with each additional current channel.

First current channel I of the controller is formed by a first storage choke L1, first and second semiconductor switches T1, T2, and first and second diodes D1, D2 which are respectively connected in parallel to switches T1, T2. Second current channel II of the controller is formed by a second storage choke L2, third and fourth semiconductor switches T3, T4, and third and fourth diodes D3, D4 which are respectively connected in parallel to switches T3, T4.

Both current channels I, II are synchronized at the same clock rate, but with an appropriate time delay. The micro-controller for synchronizing the switches (T1, T3 and/or T2, T4) can thereby be used advantageously to control the respective switches (T1, T3 and/or T2, T4) to be synchronized for the current channels I, II.

First storage choke L1 in first current channel I includes a winding W for detecting zero value current crossing. As the zero current crossings of first current channel I determine the synchronization of all the current channels, first current channel I is designated as the "master channel".

Second storage choke L2 in second current channel II that is connected in parallel to first current channel I has no authority to recognize a zero value current crossing. As such, second current channel II is controlled as a function of the zero crossing in first current channel I and is thereby designated as a "slave channel".

The ripple of the output currents ($i_1$ and/or $i_2$) is minimal when the phase shift between the sequentially triggered current channels (i.e., between master channel I and slave channel II) is 180°. That is, the ripple of output currents is minimal when the phase shift between sequentially triggered current channels such as between the master channel and one or more slave channels is 360°/n where n=number of current channels. The micro-controller determines the period of master channel I from the detected zero value current crossings to obtain the trigger time-point for slave channel II (and for any other slave channels).

The controller, which can be operated preferentially in the transition-mode under full-load conditions to thereby exhibit high efficiency, makes a transition into the partial-load region under discontinuous operation in which the efficiency is lower.

Figure 1:
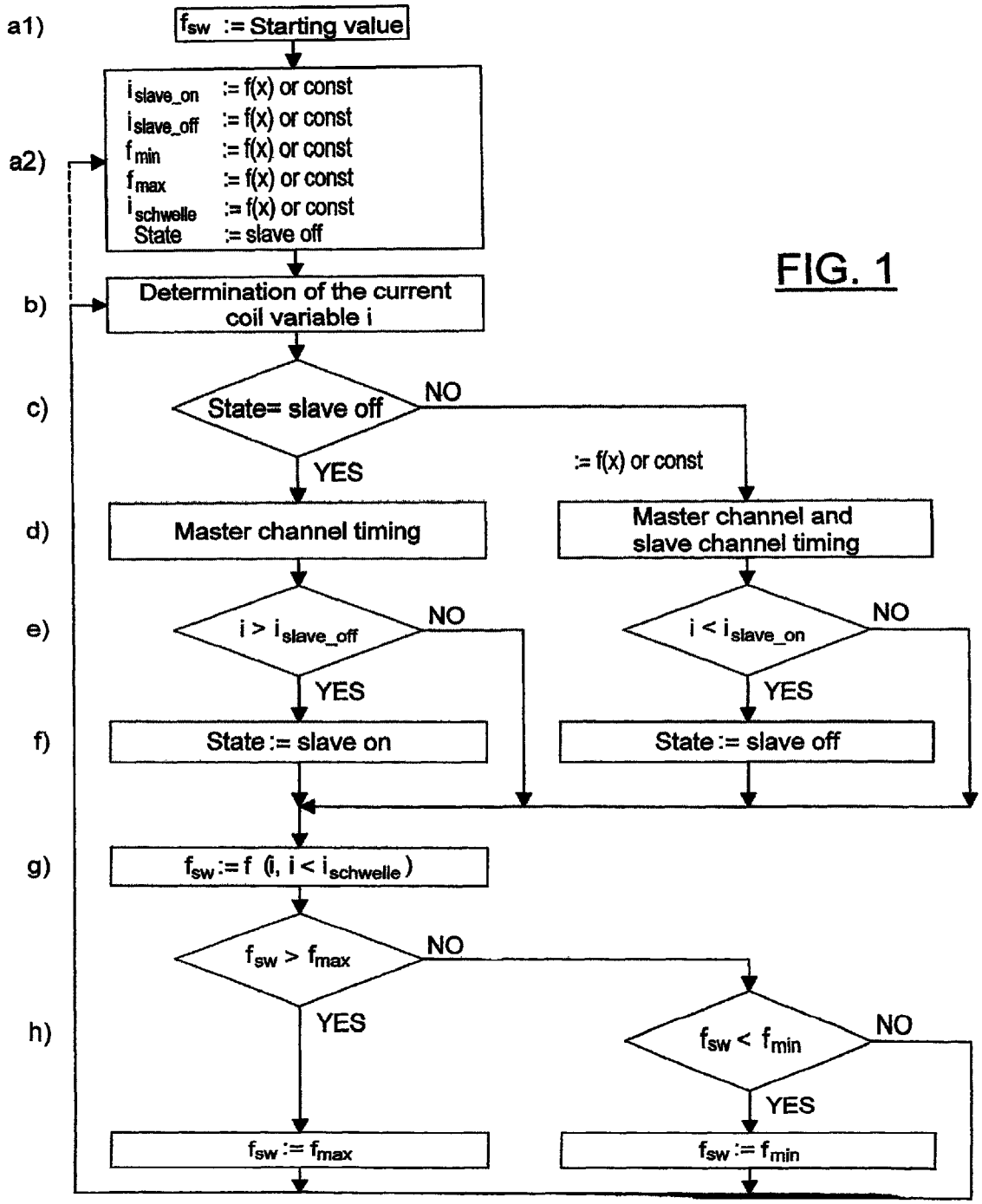
FIG. 1 illustrates a flowchart of a method for controlling a direct current ("DC") chopper controller in accordance with an embodiment of the present invention.

Referring now to FIG. 1, with continual reference to FIGS. 2 and 3, a flowchart of a method for controlling a DC chopper controller in accordance with an embodiment of the present invention is shown. The method is intended to control a DC chopper controller such that the controller achieves a highest possible efficiency. The method is carried out by the micro-controller that controls the switches (T1 to T4). The method can be used with DC chopper controllers having either only one current channel (such as the controller shown in FIG. 2) or a plurality of parallel current channels (such as the controller shown in FIG. 3).

Steps c to f are provided for the control of a controller having multiple parallel current channels with one of the current channels being a master channel and the other current channels being slave channels. As such, steps c to f are provided for the control of the controller shown in FIG. 3 which has a master channel I and a slave channel II which are connected in parallel to one another. Steps c to f lead to a minimization of slave losses under discontinuous operation by deactivating current channels if necessary. Steps c to f are not applicable for a DC chopper controller having only one current channel such as the controller shown in FIG. 2.

Steps g and h lead to a reduction in switching losses under discontinuous operation by minimizing the switching frequency to an optimal value that depends on the respective operating point. A multichannel capability in a DC chopper controller is not required for steps g and h. As such, steps g and h are applicable to both a DC chopper controller having only one current channel such as the controller shown in FIG. 2 and a DC chopper controller having multiple current channels connected in parallel to one another such as the controller shown in FIG. 3.

The method begins at steps a1, a2 with an initialization of the following variables:

$i_{slave\_on}$ current threshold for switching off the slave channel, $i_{slave\_off}$ current threshold for switching on the slave channel, $i_{schwelle}$ current threshold for determining the switching frequency, $f_{min}$ lower switching frequency, $f_{max}$ upper switching frequency, and $f_{sw}$ instantaneous switching frequency.

Partially fixed input values are indicated by "const" in FIG. 1. In addition, a logic variable state can be initialized that contains information to decide whether a slave channel is activated or deactivated.

The variable $f_{sw}$, which contains the value of the respective instantaneous switching frequency, is initialized with a starting value. The frequency limits $f_{min}$ and $f_{max}$ and the current thresholds $i_{schwelle}$, $i_{slave\_on}$, and $i_{slave\_off}$ are constants so that a return to step b can occur. At specific operating points (e.g., at high input voltages) it can be advantageous to make the concrete values of additional parameters into dependent variables, which is indicated by the notation f(x). If this is the case, then the return to step a2 takes place as indicated by the dashed lines in the flowchart.

Step b is used to determine the coil current variable i. This can be the arithmetic mean of the coil current $I_d$ or the peak value of the coil current $\hat{i}_L$. The coil current variable $\hat{i}_L$ can be determined by measurements or by calculation from the switching frequency $f_{sw}$ and the input voltage ($u_1$ and/or $u_2$).

In a DC chopper controller having parallel current channels such as master and slave current channels I, II, the logic variable state that contains the information whether only master channel I is operational (State=slave off) or whether slave channel II is activated (State=slave on) is checked in step c. According to the value of the State variable, the micro-controller synchronizes the switch of the instantaneously active current channels (I and/or I and II) in step d.

In step e, a check is carried out to determine whether the value of the coil current variable i exceeds the current threshold $i_{slave\_off}$ for an inactive slave channel and/or falls below the current threshold $i_{slave\_on}$ for an active slave channel.

In step f, the value of the State variable is changed if the check in step e is positive and remains unchanged if the check in step e is negative.

Switching slave channel II on and off thus occurs as a function of the current thresholds $i_{slave\_off}$ and $i_{slave\_on}$. As these current thresholds can have different values, the switching on and off of slave channel II is produced with a hysteresis that can be preset by the current thresholds $i_{slave\_off}$ and $i_{slave\_on}$.

Steps c to f can be expanded by the introduction of additional variables, current thresholds, and delays, so that additional slave channels can be serially switched on and off as a function of the current threshold.

In step g, the required switching frequency $f_{sw}$ for synchronizing the switch(es) is determined as a function of the measured or calculated coil current variable i and the prescribed current threshold $i_{schwelle}$.

Limitation of the calculated switching frequency $f_{sw}$ to a value lying between the upper limiting value $f_{max}$ and the lower limiting value $f_{min}$ occurs in step h.

The lower switching frequency $f_{min}$ can be assigned arbitrarily. Depending on the application, a lower switching frequency of 16 kHz may be reasonable, for example, to prevent synchronizing in the audible range. The upper switching frequency $f_{max}$ is selected so that the controller can transmit the maximal output current for a minimal input-voltage and a maximal output-voltage with a sufficiently large switching frequency $f_{sw}$.

If the switching frequency $f_{sw}$ reaches the value of the upper switching frequency $f_{max}$, then the switching frequency $f_{sw}$ is held at the value of the upper switching frequency $f_{max}$ and the current limitation by the threshold value $i_{schwelle}$ is removed for the coil current variable i. The coil current variable i can thus exceed the threshold value $i_{schwelle}$ to such an extent that the transition mode is reached for a constant switching frequency $f_{max}$.

In the transition mode, a reduction of the switching frequency $f_{sw}$ occurs after reaching the upper switching frequency $f_{max}$ for sufficiently high power levels and sufficiently large turn-on times for the switch. This is because in the transition mode switching takes place only after the coil current $i_L$ has dropped to zero and for constant voltage ratios and inductivity value of the storage choke, the switching frequency $f_{sw}$ must necessarily be reduced at higher peak currents.

If the method is used in a continuously operating controller, $f_{max}$ is the actual operational switching frequency of the controller. As the peak coil current $\hat{i}_L$ increases, the controller thereby transitions into continuous operation.

Referring now to FIGS. 4a to 4h, respective current profile diagrams are shown which clarify the dynamic limitation of the coil current variable i depicted by steps g and h in FIG. 1. In FIGS. 4a to 4h, the behavior of the coil current $i_L$ is plotted against a time axis. The coil current variable i here is the peak value of the coil current $\hat{i}_L$. Only the master channel is shown in FIGS. 4a to 4h for simplification.

Figure 4:
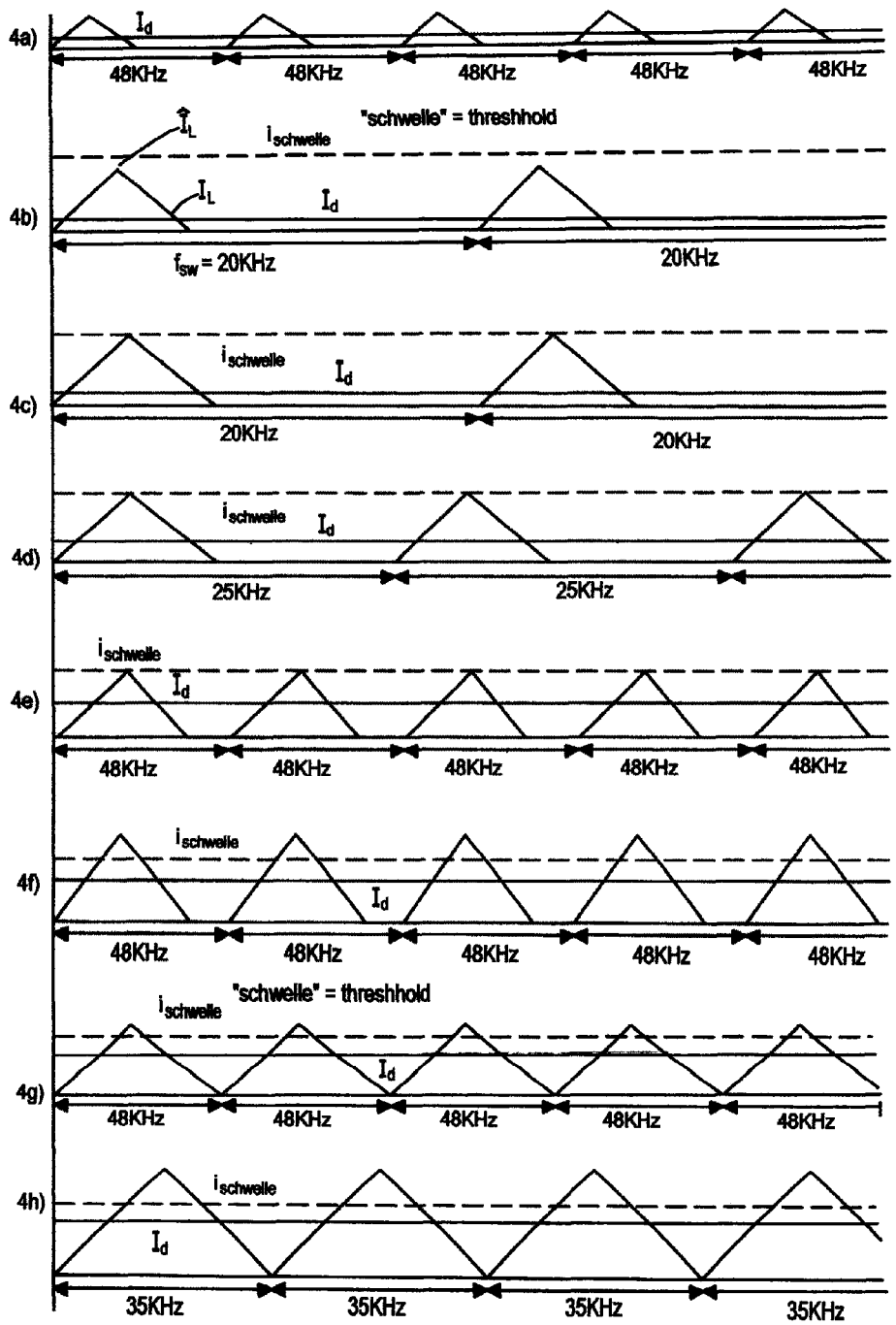
FIGS. 4a through 4h respectively illustrate profile diagrams of the coil current of a DC chopper controller which is controlled with a method in accordance with an embodiment of the present invention.

FIG. 4a shows the behavior of the coil current $i_L$ in the master channel prior to application of the method of FIG. 1. The master channel is controlled by the upper switching frequency $f_{max}$. The turn-on time is specified by the micro-controller so that the desired arithmetic mean value of the coil current $I_d$ flows.

The method shown in FIG. 1 comes into action as follows. As long as the coil current variable i is smaller than the threshold value $i_{schwelle}$, the switching frequency $f_{sw}$ is set back to the lower switching frequency $f_{min}$. The lower switching frequency $f_{min}$, for example, is 20 kHz as shown in FIG. 4b. If a larger mean output current flows, then the storage choke of the master channel is first controlled up to the threshold value $i_{schwelle}$ as shown in FIG. 4c. In order to increase the coil current variable i, the switching frequency increases due to steps g and h as shown in FIG. 4d. During a further rise in the coil current variable i, the switching frequency $f_{sw}$ is increased up to the upper switching frequency $f_{max}$, which, for example, is 48 kHz as shown in FIG. 4e.

If the coil current variable i continues to increase after reaching the upper switching frequency $f_{max}$, then the threshold $i_{schwelle}$ for the peak value of the coil current $\hat{i}_L$ is removed as shown in FIG. 4f.

During a further increase in the mean value of the coil current $I_d$, the turn-on time of the synchronized switch continues to increase, and thus also the coil current variable i, until the transition mode is reached as shown in FIG. 4g.

If the mean value of the coil current $I_d$ increases further, then the coil current variable i must likewise increase, whereby the transition mode is maintained. The switching frequency $f_{sw}$ drops to 35 kHz due to the higher coil current variable i as shown in FIG. 4h. The switching frequency $f_{sw}$ adjusts itself so that the current-time area of the coil current $i_L$ corresponds to the current-time area of the arithmetic mean of the current $I_d$.

REFERENCE SYMBOLS

D1 first (free running) diode
D2 second (free running) diode
I first current channel (master channel)
II second current channel (slave channel)
L1 first storage choke
L2 second storage choke
T1 first semiconductor switch
T2 second semiconductor switch
T3 third semiconductor switch
T4 fourth semiconductor switch
U1 first voltage source
U2 second voltage source
W winding
a to h Method Steps
$u_1$, $u_2$ first and second voltages (of the first and second voltage sources U1 and U2)
i coil current variables
$i_L$ instantaneous value of the coil current
$1_L$ peak value of the coil current
$i_1$, $i_2$ induction currents (output currents)
$I_d$ arithmetic mean of the coil current
$i_{schwelle}$ current threshold for determining the switching frequency
$i_{slave\_on}$ current threshold for switching off the slave channel
$i_{slave\_off}$ current threshold for switching on the slave channel
$f_{min}$ lower switching frequency
$f_{max}$ upper switching frequency
$f_{sw}$ instantaneous switching frequency
State Logic Variable While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method of controlling a direct current chopper controller having a transistor switch and a storage choke, wherein the storage choke has a coil current which depends on the switching of the switch on and off, the method comprising:
   calculating a coil current variable derived from one of the time averaged value of the coil current of the storage choke and the peak value of the coil current of the storage choke;
   calculating a switching frequency for synchronizing the turning on and the turning off of the switch as a function of the coil current variable and on the condition of whether the coil current variable exceeds a predetermined current threshold;
   if the calculated switching frequency is lower than a predetermined low switching frequency, then setting the calculated switching frequency to be equal to the predetermined low switching frequency;
   if the coil current variable is less than the predetermined current threshold, then setting the calculated switching frequency to be equal to the predetermined low switching frequency;
   if the calculated switching frequency is greater than a predetermined high switching frequency, then setting the calculated switching frequency to be equal to the predetermined high switching frequency; and
   switching the switch on and off in accordance with the calculated switching frequency.

2. The method of claim 1 wherein:
the coil current variable is the time averaged value of the coil current of the storage choke.

3. The method of claim 1 wherein:
the coil current variable is the peak value of the coil current of the storage choke.

4. The method of claim 1 further comprising:
setting the calculated switching frequency to be equal to the predetermined high switching frequency when the coil current variable exceeds the predetermined current threshhold.

5. The method of claim 1 wherein:
the predetermined current threshhold is dependent on at least one electrical variable.

6. The method of claim 5 wherein:
the at least one electrical variable include an input voltage to the storage choke and an output voltage of the storage choke.

7. A method of controlling a direct current chopper controller having first and second channels connected in parallel to one another, wherein each channel includes a transistor switch and a storage choke, wherein the storage choke of each channel has a coil current which depends on the switching of the switches on and off, the method comprising:
   for each channel, calculating a coil current variable derived from one of the time averaged value of the coil current of the storage choke of the channel and the peak value of the coil current of the storage choke of the channel;
   if the switch of the second channel is switched off, then switching the switch of the second channel on if the coil current of the storage choke of the second channel is greater than a predetermined off current threshold;
   if the switch of the second channel is switched on, then switching the switch of the second channel off if the coil current of the storage choke of the second channel is less than a predetermined on current threshold;
   calculating a switching frequency for synchronizing the turning on and the turning off of the switch of the first channel as a function of the coil current variable of the first channel and on the condition of whether the coil current variable of the first channel exceeds a predetermined current threshold;
   if the calculated switching frequency is lower than a predetermined low switching frequency, then setting the calculated switching frequency to be equal to the predetermined low switching frequency;
   if the coil current variable is less than the predetermined current threshold, then setting the calculated switching frequency to be equal to the predetermined low switching frequency;
   if the calculated switching frequency is greater than a predetermined high switching frequency, then setting the calculated switching frequency to be equal to the predetermined high switching frequency; and
   turning the switch of the first channel on and off in accordance with the calculated switching frequency.

8. The method of claim 7 wherein:
the coil current variable for each channel is the time averaged value of the coil current of the storage choke of the channel.
9. The method of claim 7 wherein:
the coil current variable for each channel is the peak value of the coil current of the storage choke of the channel.

10. The method of claim 7 further comprising:
setting the calculated switching frequency to be equal to the predetermined high switching frequency when the coil current variable for the first channel exceeds the predetermined current threshhold.

* * * * *